(12) United States Patent
Bucur

(10) Patent No.: US 12,095,098 B2
(45) Date of Patent: Sep. 17, 2024

(54) HIGH ENERGY DENSITY LITHIUM METAL BASED ANODE FOR SOLID-STATE LITHIUM-ION BATTERIES

(71) Applicant: Piersica, Inc., Tallahassee, FL (US)

(72) Inventor: Claudiu B. Bucur, Sunrise, FL (US)

( * ) Notice: Subject to any disclaimer, the term of this patent is extended or adjusted under 35 U.S.C. 154(b) by 0 days.

(21) Appl. No.: 18/234,601

(22) Filed: Aug. 16, 2023

(65) Prior Publication Data

US 2023/0395811 A1    Dec. 7, 2023

Related U.S. Application Data

(63) Continuation of application No. 17/249,934, filed on Mar. 18, 2021, now Pat. No. 11,742,494.

(51) Int. Cl.
| | | |
|---|---|---|
| *H01M 4/80* | (2006.01) | |
| *H01M 4/134* | (2010.01) | |
| *H01M 4/66* | (2006.01) | |
| *H01M 10/0525* | (2010.01) | |
| *H01M 4/02* | (2006.01) | |

(52) U.S. Cl.
CPC ........... *H01M 4/806* (2013.01); *H01M 4/134* (2013.01); *H01M 4/664* (2013.01); *H01M 4/667* (2013.01); *H01M 10/0525* (2013.01); *H01M 2004/027* (2013.01)

(58) Field of Classification Search
CPC ...... H01M 4/806; H01M 4/134; H01M 4/664; H01M 4/667; H01M 10/0525
See application file for complete search history.

(56) References Cited

U.S. PATENT DOCUMENTS

| | | | |
|---|---|---|---|
| 4,315,975 A | | 2/1982 | Sekido et al. |
| 4,794,060 A | | 12/1988 | Belanger et al. |
| 5,705,293 A | | 1/1998 | Hobson |
| 5,824,434 A | * | 10/1998 | Kawakami ............. H01M 4/24 |
| | | | 429/214 |
| 10,074,835 B2 | | 9/2018 | Lee et al. |
| 10,084,207 B2 | | 9/2018 | Bhardwaj et al. |
| 10,256,503 B2 | | 4/2019 | Bae et al. |
| 10,886,560 B2 | | 1/2021 | Kim et al. |

(Continued)

FOREIGN PATENT DOCUMENTS

WO    2018183771 A1    10/2018

OTHER PUBLICATIONS

International Search Report and Written Opinion mailed Jun. 8, 2021 for corresponding International Application No. PCT/US2021/070290.

*Primary Examiner* — Kenneth J Douyette
(74) *Attorney, Agent, or Firm* — Richard C. Piercy, Esq.; Grell & Watson Patent Attorneys LLC

(57) ABSTRACT

An assembly of lithium-based solid anodes to be formed into a lithium-ion battery. The anodes are formed with a fibrous ceramic or polymer framework having open spaces and an active surface material having lithiophilic properties. Open spaces within the fibrous framework and lithiophilic coatings deposited upon the surface of the fibrous framework allow for the free transport of solid lithium-ions within the anodes. In solid-state, lithium batteries can achieve higher capacity per weight, charge faster, and be more durable to extreme handling and temperature. A method for manufacturing a solid-state lithium battery having such an anode.

17 Claims, 4 Drawing Sheets

(56) References Cited

U.S. PATENT DOCUMENTS

| | | |
|---|---|---|
| 2013/0260246 A1 | 10/2013 | Chen et al. |
| 2017/0133662 A1 | 5/2017 | Cui et al. |
| 2019/0181425 A1 | 6/2019 | Tour et al. |
| 2019/0190004 A1 | 6/2019 | Zheng et al. |
| 2019/0221841 A1 | 7/2019 | Anandan et al. |
| 2020/0185778 A1 | 6/2020 | Lim et al. |
| 2020/0266479 A1 | 8/2020 | Hupfer et al. |
| 2020/0274155 A1 | 8/2020 | Li |
| 2020/0328423 A1 | 10/2020 | Li et al. |
| 2020/0365897 A1 | 11/2020 | Badding et al. |

\* cited by examiner

HIGH ENERGY DENSITY LITHIUM METAL BASED ANODE FOR SOLID-STATE LITHIUM-ION BATTERIES

CROSS-REFERENCE TO RELATED APPLICATIONS

This United States Non-Provisional patent application is a continuation of and, to the full extent permitted by law, claims priority to and the full benefit of U.S. Non-Provisional patent application Ser. No. 17/249,934 entitled "HIGH ENERGY DENSITY LITHIUM METAL BASED ANODE FOR SOLID-STATE LITHIUM-ION BATTERIES" filed Mar. 18, 2021, now U.S. Pat. No. 11,742,494, which, to the full extent permitted by law, claimed priority to and the full benefit of, United States Provisional application entitled "A HIGH ENERGY DENSITY LITHIUM METAL BASED ANODE FOR SOLID-STATE LITHIUM ION BATTERIES," having assigned Ser. No. 62/991,418, filed on Mar. 18, 2020, which is incorporated herein by reference in its entirety.

FEDERALLY SPONSORED RESEARCH OR DEVELOPMENT

None

PARTIES TO A JOINT RESEARCH AGREEMENT

None

REFERENCE TO A SEQUENCE LISTING

None

BACKGROUND OF THE DISCLOSURE

Technical Field of the Disclosure

The instant disclosure relates to chemistry, namely electrical current producing apparatuses. More particularly, the instant disclosure relates to the manufacture of battery components having certain improvements to the manufacture of an anode in order to increase performance, safety, and reliability of the overall battery.

Description of the Related Art

A lithium-ion battery, or Li-ion battery, is a type of rechargeable battery commonly used in portable electronics and electric vehicles. Compared with previous battery technologies, lithium-ion batteries offer faster charging, larger capacity, and higher power density which allows for greater performance in a smaller and lighter package. While there are a large number of reasons that lithium has become a favorable element in battery technology, the most important reasons have to do with its elemental structure. Lithium is highly reactive because it readily loses its outermost electron, allowing current to easily flow through a battery. As the lightest metal, lithium is much lighter than the other metals commonly used in batteries (e.g., lead). This property is important for small objects such as phones but also for cars that require many batteries. Finally, lithium-ions and electrons move easily back into positive electrodes (cathodes), allowing for numerous recharging cycles. Innovation in lithium-ion battery technology has helped to minimize the form factor of electronic devices while simultaneously increasing their capabilities. Smart phones, smart watches, wearable devices, and other modern electronic luxuries simply would not be possible without some of the lithium-ion battery advances witnessed in recent decades.

Conventional lithium-ion batteries use a liquid electrolyte. The liquid electrolytic solution in a liquid electrolyte lithium-ion battery is used to regulate the current flow during charging and discharging. Current "flows" through the liquid electrolytic solution between the anode and cathode in order to allow a battery user to store and then use the electrical energy stored with the battery. More specifically, lithium-ions move from the negative electrode (the anode) through an electrolyte to the positive electrode (the cathode) during discharge, and back when charging. These lithium-ion batteries usually use an intercalated lithium compound as the material at the cathode and graphite at the anode. Graphite in its fully lithiated state of $LiC_6$ correlates to a maximal capacity of 372 mAh/g.

While liquid lithium-ion batteries have a high energy density, no memory effect, and low self-discharge, they can be a safety hazard since they contain flammable electrolytes. If damaged and exposed to air or incorrectly charged, these batteries can lead to or even cause explosions and fires. Removable lithium-ion battery recalls due to fire hazard are common and costly, and several portable electronics manufacturers have even been forced to recall expensive electronic devices without removable batteries due to lithium-ion fires. This issue is of increasing concern due to incorporation of liquid lithium-ion batteries in electric vehicles (EVs). During and immediately after an accident, an EV's liquid lithium-ion battery may be readily ignited when exposed to water in the air, thus posing a major safety problem. This safety issue is becoming more important to address as electric vehicles become increasingly commercially viable and more widely adopted.

Much of the research and development to address these concerns with liquid lithium-ion batteries has been focused on the development of batteries with liquid-less anodes. Lithium, in its solid-state has a maximum possible capacity of 3600 mAh/g, or nearly ten times that off $LiC_6$. However, lithium metal is also highly reactive in its solid-state and it plates very unevenly. Even in liquid electrolyte lithium-ion batteries, if plating rates exceed what would normally be considered low critical currents (0.5 mA/cm$^2$), lithium can nucleate and form dendritic or mossy structures rather than smooth or flat plates. This is many times the reason for swelling, expansion, and even puncturing of liquid lithium-ion batteries. In legacy versions of solid lithium foil anode batteries, this current rate is even smaller (0.1 mA/cm$^2$). Therefore, much like many advances in liquid electrolyte lithium-ion batteries have decreased the potential for dendritic or moss-like formations, advances in prevention of this occurrence is even more important if solid-state lithium-ion anodes were to be produced. A battery having a much larger energy storage capacity would be advantageous if charging and discharging rates were in the same range of what consumers and manufacturers have come to expect from modern liquid lithium-ion batteries.

Therefore, it is readily apparent that there is a recognized unmet need for improvements to allow for a high energy density lithium metal based anode for solid-state lithium-ion batteries. The current disclosure is designed to address this need through various improvements to the components and internal structure, which includes the anode disclosed herein while addressing at least some of the aspects of the problems discussed above.

SUMMARY

Briefly described, in a possibly preferred embodiment, the present disclosure overcomes the above-mentioned disadvantages and meets the recognized need for such an anode by introducing various improvements to the manufacture, construction, and design of batteries to accommodate a lithium-ion anode having a solid electrolyte (i.e., a solid-state lithium-ion anode). These generally include but are not limited to a lithium-ion conductor, an electronic conductor, mixed ionic/electronic conductors, lithophilic coatings, current collector(s), and improved welds, either separately or in combination. By allowing for a solid-state lithium-ion anode, these improvements have the potential to increase the energy storage capacity of a lithium-ion battery from its theoretical maximum in liquid electrolyte form to its more energy dense solid form. Additionally, these improvements, alone and/or in combination, help to decrease the potential for harm, such as fire, resulting from expansion, swelling, or damage to a lithium-ion battery. These improvements, alone and/or in combination, may allow for these benefits without the sacrifice of decreasing charging speed and power supply to devices.

One aspect of the high energy density lithium metal based anode for solid-state lithium-ion batteries may be a lithium-ion conductor. The lithium-ion conductor may be manufactured in a variety of forms, each having corresponding benefits and tradeoffs. These variations in forms may be better understood to be separate distinct embodiments of the lithium-ion conductor.

In a first possibly preferred embodiment, the lithium-ion conductor may be comprised of a ceramic framework. The ceramic framework, or skeleton, may be utilized to support the lithium metal of the lithium-ion conductor. Lithium metal may provide the electronic conductivity while the solid ceramic framework/skeleton may provide volumetric support and lithium-ion conductivity. One means to combine and/or operably engage lithium metal with the ceramic framework/skeleton may be through melt infusion of lithium metal into a treated ceramic framework. Initially, only a small quantity of lithium metal may be needed to be infused into the pre-cell assembly. In such a case where only a small quantity is infused into the pre-cell assembly of the lithium-ion conductor, all reversible lithium which gives a cell its capacity may instead come from the cathode in the final assembly. This may occur through high voltage insertion cathodes such as lithium ferrophosphate (LFP), lithium cobalt oxide (LCO), nickel/manganese/cobalt (NMC), the like and/or combinations thereof varieties of cathodes. The higher surface area of the ceramic skeleton may allow for higher rates of operation (plating/stripping of lithium) of the solid battery if compared to a flat lithium foil. From the point of view of energy density, an important requirement for ceramic skeletons may be the use of low-density ceramic. A proposed example low-density lightweight ceramic may be $Li_{1+x}Al_xTi_{2-x}P_3O_{12}$ (LATP). In this embodiment of the lithium-ion conductor having a ceramic framework/skeleton, there may be additional components, methods of manufacture, and further variation that include various benefits and tradeoffs. These may include choice in active material and type of functional material processing. These distinctions will become more apparent to one skilled in the art from the following Brief Description of the Drawings, Detailed Description of exemplary embodiments thereof, and Claims when read in light of the accompanying Drawings or Figures.

In a second possibly preferred embodiment of the lithium conductor aspect of the disclosed high energy density lithium metal based anode for solid-state lithium-ion batteries, a polymer framework or skeleton may be preferred. A polymer skeleton/framework of the lithium conductor aspect of the high energy density lithium metal based anode for solid-state lithium-ion batteries may offer the added benefit of being flexible, where a ceramic framework/skeleton may be described as rigid. Requirements of a polymer framework/skeleton may be (a) having a melting point above the melting point of lithium metal (180 C), (b) high conductivity of lithium-ions, and (c) infusion with lithium conductive material into the structure, such as other conductive polymers with the corresponding lithium salt (e.g., Lithium bis(trifluoromethanesulfonyl)imide/$LiC_2F_6NO_4S_2$/LiTFSI) or ceramic particles imbedded into the polymer and/or upon its surface. In this embodiment of the lithium-ion conductor having a polymer framework/skeleton, there may be additional components, methods of manufacture, and further variation that include various benefits and tradeoffs. These may include a fiber mat which may further include polyimide, aramids, and polyimide frames. These distinctions will become more apparent to one skilled in the art from the following Brief Description of the Drawings, Detailed Description of exemplary embodiments thereof, and Claims when read in light of the accompanying Drawings or Figures.

In a third possibly preferred embodiment of the lithium conductor aspect of the disclosed high energy density lithium metal based anode for solid-state lithium-ion batteries, a hybrid composite framework or skeleton may be preferred. In this embodiment of the lithium-ion conductor having a hybrid composite framework/skeleton, there may be components, methods of manufacture, and further variation that include various benefits and tradeoffs. These may include a fiber mat which may further include fumed silica and G4/LiTFSA, boron nitride/vanadium nitride doping, doping of other nitrides, the like and/or combinations thereof. These distinctions will become more apparent to one skilled in the art from the following Brief Description of the Drawings, Detailed Description of exemplary embodiments thereof, and Claims when read in light of the accompanying Drawings or Figures.

Another aspect of the high energy density lithium metal based anode for solid-state lithium-ion batteries is an electronic conductor. In addition to an infused lithium metal, an electronic conductive component may be required in the anode to improve electronic conductivity and homogeneous plating during charging. These materials may also play a crucial role in inhibiting dendritic growth of lithium. Eutectic mixtures of lithium with other metals may provide a softer lithium based metal anode having properties of plastic flow.

Yet another aspect of the high energy density lithium metal based anode for solid-state lithium-ion batteries may be the incorporation of mixed ionic/electronic conductors (MIEC) at the battery electrode. In combination with the anode of the disclosure, MIECs may be a very promising class of materials for solid electrodes. MIECs differ from solid ionic conductors in that they conduct electrons themselves, in addition to ions. MEICs may be best suited for electrodes, where both electronic and ionic conduction may be required. MEICs may be incapable of use as battery separators, where only ionic conductivity (and electronic insulation) may be required.

Yet another aspect of the high energy density lithium metal based anode for solid-state lithium-ion batteries may be lithiophilic coatings to either a ceramic and/or polymer framework/skeleton. Lithiophilic coatings may be crucial for the use of ceramic or polymeric skeletons. Since ceramic and/or polymer frameworks/skeletons may not have a good interface with lithium metal in their unimproved state, an improvement incorporating coatings having lithiophilic properties may be critical to the inclusion of these types of frameworks/skeletons in a high energy density lithium metal based anode for solid-state lithium-ion batteries. Incorporation of lithiophilic coatings to ceramic and/or polymer frameworks/skeletons may further encourage reduction of dendritic growth of lithium during plating and/or promote smooth plating. Lithiophilic coatings of ceramic and/or polymer frameworks/skeletons may also extend the range of suitable choices for ceramic or polymeric frameworks/skeletons to materials which may otherwise react with lithium absent the lithiophilic coatings, thereby which may otherwise prevent certain ceramics and/or polymers from being used in conjunction with lithium in a coating-free state. Lithiophilic coatings come in a variety of forms, each of which may involve their own protocol for distribution and adherence to a surface of a ceramic and/or polymer framework/coating. The high energy density lithium metal based anode may be understood, either by virtue of lithiophilc properties of the materials used to create a lithiophilic framework, or through the addition of lithiophilic coating(s), to be a fiber mat or polymer mat having lithiophilic properties, the fiber mat or polymer fiber mat having one or more cavities by which lithium or other metals may be deposited.

Yet another aspect of the high energy density lithium metal based anode for solid-state lithium-ion batteries may be a current collector for the anode. A current collector is an electronic conductor which carries the electrons from the anode to the cathode through an external load, powering the load device. Traditionally, copper foil is used for anode current collectors. Use of copper foil further provides support for commercial graphite anodes. The development of a new type of current collector which bonds well with the ceramic and/or polymer framework/skeleton having infused lithium metal may be required in the high energy density lithium metal based anode for solid-state lithium-ion batteries may be a current collector for the anode of the disclosure to carry the electrons through the load during charging and operation of the batteries.

Yet another aspect of the high energy density lithium metal based anode for solid-state lithium-ion batteries may be a novel method of fusion among the high energy density lithium metal based anode for solid-state lithium-ion batteries, its coatings and components, and the surrounding battery components. Copper current collectors may be typically weld tabbed together in order to carry electronic current to bus bars outside the battery cells. As disclosure herein, development of weld tabbing the current collector as described herein to a ceramic and/or polymer framework/skeleton having lithiophilic coatings and in combination with solid lithium metal may further enhance, or even make possible, the high energy density lithium metal based anode for solid-state lithium-ion batteries of the disclosure.

Alone, or in combination, various aspects and features of the high energy density lithium metal based anode for solid-state lithium-ion batteries may offer benefits over both traditional liquid electrolyte lithium-ion batteries, as well as over existing, available, experimental, and/or proposed solid-state lithium-ion batteries. A benefit of the high energy density lithium metal based anode for solid-state lithium-ion batteries may be its ability to increase the energy density of anodes above that of currently commercial graphite based anodes. Another benefit of the high energy density lithium metal based anode for solid-state lithium-ion batteries may be its ability to provide high currents of operation above the currently observed 0.1-0.5 mA/cm$^2$ for solid-state batteries and nearing as high as 10 mA/cm$^2$ which may be of significant commercial significance for charging a battery in less than 30 minutes. Another feature of the high energy density lithium metal based anode for solid-state lithium-ion batteries may be its ability to provide a safe lithium metal anode structure with lithiophilic interphases which may result in high cycle life (e.g., greater than 4000 cycles), which may also be of commercial significance for electric vehicles and other durable goods requiring longevity of installed batteries. Another feature of the high energy density lithium metal based anode for solid-state lithium-ion batteries may be the ability to operate over a much wider temperature range (e.g., −60° C. to 150° C.) than even currently available commercial graphite based anodes (−30° C. to 60° C.). Another feature of the high energy density lithium metal based anode for solid-state lithium-ion batteries may be the ability to provide a pre-lithiated anode during manufacture. Another feature of the high energy density lithium metal based anode for solid-state lithium-ion batteries may be the ability to provide a flexible anode. Another feature of the high energy density lithium metal based anode for solid-state lithium-ion batteries may be the ability to pass a nail penetration test which commercial graphite based anodes cannot do. Another feature of the high energy density lithium metal based anode for solid-state lithium-ion batteries may be the ability of the anode to resist combustion because, for instance, due to high ceramic content of possibly preferred embodiments of the high energy density lithium metal based anode for solid-state lithium-ion batteries, few flammable components would exist in the batteries of the disclosure. Another feature of the high energy density lithium metal based anode for solid-state lithium-ion batteries may be the various scalable processes resulting a mass produce-able lithium based anode.

These and other features of the high energy density lithium metal based anode for solid-state lithium-ion batteries will become more apparent to one skilled in the art from the prior Summary and following Brief Description of the Drawings, Detailed Description of exemplary embodiments thereof, and Claims when read in light of the accompanying Drawings or Figures.

BRIEF DESCRIPTION OF THE DRAWINGS

The high energy density lithium metal based anode for solid-state lithium-ion batteries will be better understood by reading the Detailed Description with reference to the accompanying drawings, which are not necessarily drawn to scale, and in which like reference numerals denote similar structure and refer to like elements throughout, and in which.

Figure 1:
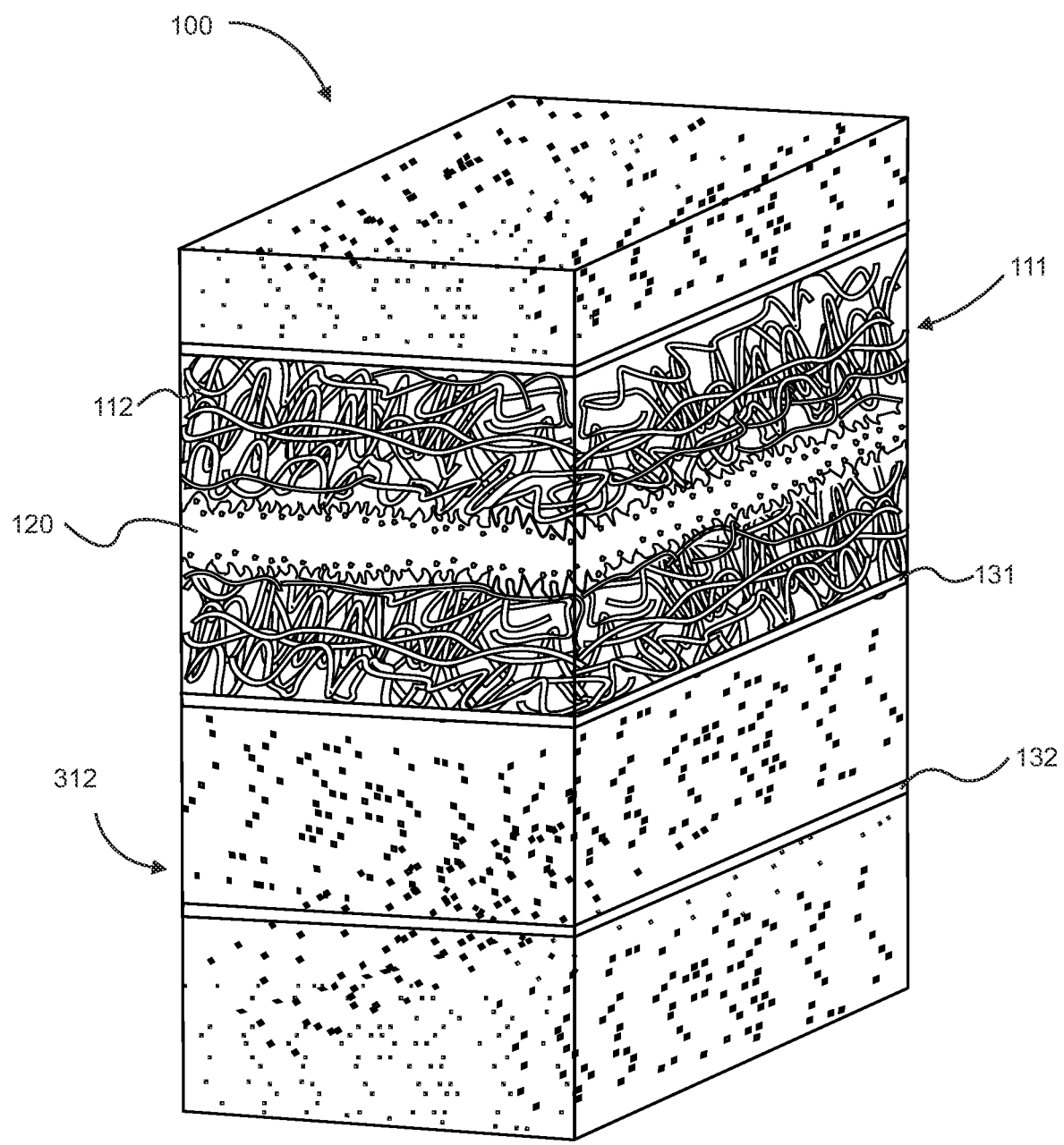
FIG. 1 is a perspective view of a section of an exemplary embodiment of the high energy density lithium metal based anode for solid-state lithium-ion battery of the disclosure.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

In describing the exemplary embodiments of the present disclosure, as illustrated in FIGS. 1-4, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples. It should be noted that the terms battery, cell, anode, cathode and separator, in their singular and plural form, are used as they relate to the high energy density lithium metal based anode for solid-state lithium-ion batteries of the disclosure, as well as used to describe other batteries, including but not limited to lithium-ion batteries having a liquid electrolyte. While a single cell of a battery may be herein described, one skilled in the art of battery manufacture will understand that multiple cells may be used in the design, construction, manufacture, and assembly of a battery, and multiple batteries may be arranged and/or installed within a completed manufactured good. While fiber framework is used consistently throughout this detailed description, it may also be understood as a fibrous battery skeleton.

Referring now to FIGS. 1-4 by way of example, and not limitation, therein are illustrated example embodiments of high energy density lithium solid-state anode 111 for solid-state battery 100. Solid-state lithium-ion battery 100, liquid electrolyte battery 200, and battery 300 may be referred herein as just the battery. High energy density lithium metal based solid-state anode 111, liquid electrolyte anode 211, and anode 311 may be referred herein as just the anode. While variations in construction, design, composition, chemistry, and assembly may be relevant to cathode 312, for the sake of clarity and consistency across FIGS. 1-4, any reference to cathode 312 is simply the cathode, and other relevant features may be referred to in a description as it relates to solid-state battery 100, liquid electrolyte battery 200, and battery 300. Solid separator 131, porous separator 231, and solid separator 131 may be referred herein as just the separator. Solid-state battery 100, liquid electrolyte battery 200, and battery 300 may be charged via charger 351 and may discharge into device 352. As described herein, solid-state battery 100, liquid electrolyte battery 200, and battery 300 may each have a single cell or may have multiple cells connected and/or assembled in multiple layers of anode 311, cathode 312, and separator 331. Lithium, lithium metal, elemental lithium, and lithium-ions may be referred to interchangeably herein, and the disclosure is not so limited to a battery having lithium metal as its electrical flow element. Other elements may include but are not limited to zinc, sodium, cobalt, nickel, lead, potassium, other metals, salts thereof, the like and/or combinations thereof.

In one possibly preferred exemplary embodiment, solid-state battery 100 may include the following components: solid-state anode 111 having solid electrolyte 112 with fiber framework and shown with metal ion deposit 120, solid separator 131, and cathode 312 having solid-state cathode current collector 132. In an embodiment of liquid electrolyte lithium-ion battery 200, liquid electrolyte lithium-ion battery 200 may include the following components: liquid electrolyte anode 211 having graphite anode active material 212 and anode current collector 233, porous separator 231, and cathode 312 having liquid electrolyte cathode current collector 232. In an embodiment of battery 300, battery 300 may include the following components and connections: anode 311, cathode 312, separator 331, charger 351, and powered device 352.

Referring now more specifically to FIG. 1, illustrated therein is an example of solid-state battery 100. Starting toward the top is solid-state anode 111 having solid separator 131 both above and beneath solid-state anode 111. Solid-state anode 111 may be formed from one or more layers of solid electrolyte 112, of which each layer of solid electrolyte 112 may be formed from a fiber framework. Generally, solid-state anode 11 may be understood as the negative or reducing electrode that releases electrons to the external circuit (see FIG. 3) and oxidizes during an electrochemical reaction. The cathode 312 may be understood as the positive or oxidizing electrode that acquires electrons from the external circuit (see FIG. 3) and is reduced during the electrochemical reaction. In this possibly preferred embodiment, solid-state anode 111 may be comprised solid electrolyte 112, which can be understood as a framework of interconnected fibers. The framework interconnected fibers therein solid-state anode 111 may have a variety of properties and may be either flexible or rigid. In the case of a ceramic fiber framework, ceramic may be utilized to provide structure, support to solid-state anode 111 and solid-state battery 100, as well as a surface upon which lithium, or other metals, may deposit. Lithium metal at metal ion deposit 120 may provide the electronic conductivity for solid-state battery 100 while the solid ceramic framework/skeleton may provide volumetric support, surface layer for metal ion deposit 120 and lithium-ion conductivity. During charge and discharge of solid-state battery 100, metal ion deposit 120 may grow in size toward solid separator 131 or shrink toward center of solid-state anode 111. One means to combine, manufacture, and/or operably engage metal ion deposit 120 with the fiber framework of solid electrolyte 112 may be through the melt infusion of lithium metal into a treated ceramic framework. Initially, only a small quantity of lithium metal may be needed to be infused into the pre-cell assembly of solid-state anode 111. In such a case where only a small quantity is infused into the pre-cell assembly of solid-state anode 111, most or even all reversible lithium which gives a cell its capacity may instead come from cathode 312 in the final assembly. Accordingly, during a first charge and during all subsequent charges of solid-state battery 100, metal ion deposit 120 may be detected or observed to be very small at or approximate the center of solid-state anode 111. During the charging process of solid-state battery 100, metal ion deposit 120 may be detected or observed to grow in size outward toward solid separator 131, even growing to occupy all space within the fiber framework of solid-state anode 111 along solid electrolyte 112. The deposit of lithium and/or other metals may further occur through temporary use of high voltage insertion cathodes such as lithium ferrophosphate (LFP), lithium cobalt oxide (LCO), nickel/manganese/cobalt (NMC), the like and/or combinations thereof varieties of cathodes. The higher surface area of solid electrolyte 112 having a ceramic fiber framework may allow for higher rates of operation (plating/stripping of lithium) of solid-state battery 100 if compared to a flat lithium foil. However, a flat lithium foil may also be used as an initial form of metal ion deposit 120 and may also be melt infused along center of solid-state anode 111 within solid electrolyte 112.

From the point of view of energy density, an important requirement for ceramic fiber frameworks of solid electrolyte 112 may be the use of low-density ceramic. A proposed example low-density lightweight ceramic may be $Li_{1+x}Al_xTi_{2-x}P_3O_{12}$ (LATP). In this embodiment of solid-state anode 111 having solid electrolyte 112 comprising ceramic, there may be additional components, methods of manufacture, and further variation that include various benefits and tradeoffs. These may include choice in active material and type of functional material processing. In a potentially preferred embodiment of a ceramic version of solid electrolyte 112, coating materials having qualities which attract particular metals may provide increased benefits to encourage smooth, consistent plating along the internal fiber framework. These may include engineering solid-state anode 111 having solid electrolyte 112 to measure approximately 80-90 µm in total per-layer thickness, approximately 5 cm×5 cm total length and width along solid separator 131, with porosity of internal fiber framework of percentages greater than 70%, having individual and/or average fiber diameters of less than 0.35 µm, having individual and/or average fiber lengths of greater than 1 mm, having a coating thickness of approximately 10 nm, and having coating material comprising oxides, nitrides, polymers, or ceramics. Oxide coating materials for fibers within solid electrolyte 112, by way of example and not limitation, include niobum, $Al_2O_3+ZnO$ (AZO), aluminum, indium, zinc, bismuth, magnesium, silicon, gold, iodine, and sulfur oxides, the like and/or combinations thereof oxides. Nitride coating materials for fibers within solid electrolyte 112, by way of example and not limitation include boron, vanadium nitrides, the like and combinations thereof. Polymer coating materials for fibers within solid electrolyte 112, by way of example and not limitation include succinonitrile (SCN). Ceramic coating materials for fibers within solid electrolyte 112, by way of example and not limitation include closoborates (CB), lithium phosphorus oxynitride (LiPON), the like, and/or combinations thereof. By using one or more coatings to a ceramic fiber structure of solid electrolyte 112, ceramics which may not bind readily to lithium, or other metals, may be encouraged to bind to lithium, thereby acting as an electrolyte upon which solid metals, including lithium-ions, may freely move during charge and discharge.

In a second possibly preferred embodiment of the lithium conductor aspect of solid-state anode 111 for solid-state battery 100, a polymer framework in solid electrolyte 112 be preferred. A polymer framework of solid electrolyte 112 within solid-state anode 111 may offer the added benefit of being flexible, where the previous ceramic fiber framework of solid electrolyte 112 within solid-state anode 111 may be described as rigid. This may offer various benefits and tradeoffs, both at the level of the individual cell or layer of solid-state battery 100, but also offer various tradeoffs and benefits to powered device 352, having there installed solid-state battery 100. Requirements of a polymer framework, and materials therein deposited, of solid-state anode 111 may be (a) having a melting point above the melting point of lithium metal (180 C), (b) non-conductivity of lithium-ions, and (c) infusion with lithium conductive material into the structure of solid electrolyte 112, such as other conductive polymers with the corresponding lithium salt (e.g., Lithium bis(trifluoromethanesulfonyl)imide/$LiC_2F_6NO_4S_2$/ LiTFSI) or ceramic particles embedded into the polymer and/or upon its surface. In this embodiment of solid-state anode 111 having a polymer framework of solid electrolyte 112, there may be additional components, methods of manufacture, and further variation that include various benefits and tradeoffs. These may include a fiber mat which extends throughout solid-state anode 111 and solid electrolyte 112, which may further include aramids and polyimide frames. Furthermore, while not all coatings for ceramic fiber framework may be applicable to a polymer or polymer fiber framework, and while not all properties and features of a ceramic fiber framework may be directly applicable to a polymer or polymer fiber framework, some may. These may include engineering solid-state anode 111 having solid electrolyte 112 to measure approximately 80-90 µm in total per-layer thickness, approximately 5 cm×5 cm total length and width along solid separator 131, with porosity of internal fiber framework of percentages greater than 70%, having individual and/or average fiber diameters of less than 0.35 µm, having individual and/or average fiber lengths of greater than 1 mm, having a coating thickness of approximately 10 nm, and having coating material comprising oxides, nitrides, polymers, or ceramics. Oxide coating materials for fibers within solid electrolyte 112, by way of example and not limitation, include niobium, $Al_2O_3+ZnO$ (AZO), aluminum, indium, zinc, bismuth, magnesium, silicon, gold, iodine, and sulfur oxides, the like and/or combinations thereof oxides. Nitride coating materials for fibers within solid electrolyte 112, by way of example and not limitation include boron, vanadium nitrides, the like and combinations thereof. Polymer coating materials for fibers within solid electrolyte 112, by way of example and not limitation include succinonitrile (SCN). Ceramic coating materials for fibers within solid electrolyte 112, by way of example and not limitation include closoborates (CB), lithium phosphorus oxynitride (LiPON), the like, and/or combinations thereof. By using one or more coatings to a ceramic fiber structure of solid electrolyte 112, ceramics which may not bind readily to lithium, or other metals, may be encouraged to bind to lithium, thereby acting as an electrolyte upon which solid metals, including lithium-ions, may freely move during charge and discharge.

Included in a potentially preferred embodiment of either a ceramic fiber framework or a polymer fiber framework of solid-state anode 111 and solid electrolyte 112, initial deposits of lithium may be important for several reasons. These may be formed initially at metal ion deposit 120 in a very small, nearly insubstantial amount, but grow in size, weight, and volume, and even may occupy all empty space within solid-state anode 111 and solid electrolyte 112. This may be accomplished through various means, though a potentially preferred process to initially deposit metal near the center of solid-state anode 111 on the surface of solid electrolyte 112, and its fibers, may be through the melt infusion of lithium foil.

Additionally, the manufacture of the fibers themselves, whether ceramic or polymer, may offer a variety of important improvements to the structure, formation, and overall properties of solid electrolyte 112, solid-state anode 111 and solid-state battery 100. These techniques may have little to no known applications in the battery technology industry, but may have significant applications in the materials sciences and non-woven material industry. One such process may include sol-gel processes, which may preferably occur prior to deposit of metal ion deposit 120. In this chemical procedure, a "sol" (a colloidal solution) can be formed that then gradually evolves towards the formation of a gel-like diphasic system containing both a liquid phase and solid phase whose morphologies range from discrete particles to continuous polymer networks. In the case of the colloid, the volume fraction of particles may be so low that a significant amount of fluid may be required to be removed initially for the gel-like properties to be recognized. One such means of fluid removal may be to simply allow time for sedimentation to occur, and then pour off the remaining liquid. Centrifugation can also be used to accelerate the process of phase separation. Removal of the remaining liquid (solvent) phase requires a drying process and may result in a significant amount of shrinkage and densification. The rate at which the solvent can be removed is ultimately determined by the distribution of porosity in the gel. The ultimate microstructure of the final component can be strongly influenced by changes imposed upon the structural template during this phase of processing. A thermal treatment, or firing process, is often necessary in order to favor further polycondensation and enhance mechanical properties and structural stability via final sintering, densification, and grain growth. One of the distinct advantages of using this methodology as opposed to the more traditional processing techniques is that densification is often achieved at a much lower temperature. The precursor sol can be either deposited on a substrate to form a film (e.g., by dip-coating, spin coating, or electrospinning), cast into a suitable container with the desired shape (e.g., to obtain monolithic ceramics, glasses, fibers, membranes, aerogels), or used to synthesize powders (e.g., microspheres, nanospheres). This technique, in combination with electrospinning, is known to create a paper-like material having open cavities which may be highly suitable for the depositing of metals, namely lithium ions. Additional processes which may further enhance this space-filling and open cavity feature of solid electrolyte 112, using various compositions of the disclosed ceramics and polymers, may include co-precipitation, evaporation and self-assembly, and utilization of nano-particles.

In either a ceramic or polymer embodiment of solid electrolyte 112, the material by which the fibrous structure having open cavities, the fibrous structure having a lithiophilic coating, may be considered an active material, of which comprises solid-state anode 111. In other words, the active material of solid-state anode 111 may be solid electrolyte 112, which is the active material through which lithium-ions migrate, congregating at metal ion deposit 120. Whichever active material is manufactured in order to create solid-state anode 111 can be processed into a functional material having these properties and acting as solid electrolyte 112 of solid-state battery 100. A first stage in this process may be synthesis of a fiber mat including substances such as LATP, closoborates, and sulfide ceramics. Stages in the sol-gel, or other processes to form the open cavity structure of solid electrolyte 112, may be improved through lower the firing temperature required by implementation of aliovalent substitutions. Other improvements may include maximize density by using flux additives (e.g., $Li_2O$, MgO, ZnO, $Li_3PO_4$, $Li_3BO_3$, $B_2O_3$, $LiBO_2$, $Al_2O_3$, Ta, Nb, Y, Al, Si, Mg, Ca, YSZ, NiO, $Fe_2O_3$, the like, and/or combinations thereof). In order to achieve functional material processing of solid electrolyte 112, the active material of a pre-assembly solid electrolyte 112 may be required to obtain a rugged functional laminate, sheets or mats for use as solid-state anode 111. Slurry additives may be added in order to process a green laminate during the process of rapid sintering. These slurry additives may include, but are not limited to resins, oils, and dispersants (e.g., PAA, glucose, PVP, ethylene glycol, oleic acid, ultrasonic horn, the like and/or combinations thereof). Sintering of the green material using traditional techniques known to those skilled in the art can be a long process (>10 hours) and may need to occur at high temperatures (>1250° C.). These traditional requirements may require high costs of operation, difficulty in scaling up as well, and an undesired loss of lithium by evaporation during sintering. The loss of lithium at these times and temperatures may need to be counter measured by using extra lithium salts during synthesis, which only further increases cost. Instead, methods to allow for scalable application in open atmosphere and prevent the loss or consumption of lithium should be substituted. The resulting sintered green laminate should contain voids for lithium metal melt infusion, subsequent to sintering, which can then occur at room temperature. Voids can instead be built in by using sacrificial plastic/carbon beads or by electrospinning the into fiber mats, as described above. The resulting solid electrolyte 112 may then be suitable for deposit of lithium along metal ion deposit 120.

Alternative measures to encourage these properties in solid electrolyte 112, thereby creating an optimal solid-state anode 111, may include buy are not limited to reactive sintering of starting materials, sintering within an electric field, microwave sinter, SPS or spark plasma, cold sintering using solvent evaporation and salts CSP, and flash sintering using high currents. Alternatively, or in combination with these techniques of the development of solid electrolyte 112, porous sheets may be manufactured using sacrificial beads which are various plastics or carbons with low vaporization temperatures that can be removed and/or destroyed leaving openings in the fiber mat, or the development of a ceramic fiber mat through electrospinning. Other contemplated means which specifically apply to polymer fiber versions of solid electrolyte 112 include the use of polymers having melting points of lithium metal (180 C). These polymers, however, typically do not conduct lithium-ions so they, would serve a structural role upon which additional lithium conductive material may be infused into the structure such as other conductive polymers (with the corresponding lithium salt such as LiTFSI) or ceramic particles. For instance, by way of example and not limitation, fiber mat comprising polyimide (having melting point of 450° C.) may be used to infuse with melted lithium and serve as a coating. Further examples include aramids, polyimide frames. Yet another example of providing a suitable formation for solid electrolyte 112 may be a hybrid composite structure having both polymer fiber and ceramic fiber properties. A hybrid composite fiber mat could include fumed silica and G4/LiTFSA with boron/vanadium (or other nitrides) doping upon the surface.

Further important to the surface structure and composition of solid electrolyte 112 may be coating alternatives which may offer, either alone or in combination, additional benefits to the deposit, motility, and smooth plating of metal ion deposit 120. These may include CVD/PVD/PECVD and/or ALD vapor deposition in combination with AZO coating, use of $I_2$, $Li_3N$, $Li_3PO_4$, LLZO, $Li_9AlSiO_8$, $Li_3OCl$, $LiI_4CH_3OH$, or use of metals which alloy well with lithium, including but not limited to aluminum, indium, zinc, magnesium, silicon, and/or gold. Solution coating may also be used upon, or form a critical component of, solid electrolyte 112, which may be developed using a sulfur-based solution coating method with solutions of, for example, polysulfides, dissolved sulfur ZnO doped argyrodite $Li_6PS_5Br$, $Li_2S_3$ or $Li_3S_4$ dissolved in DEGDME. Polymer coatings may additionally be employed as a surface coating to solid electrolyte 112, which may include SN/FEC with additives and salts (e.g., $CsPF_6$, CsTFSI, $LiNO_3$, LiF, $CuF_2$), elastomers such as SHP, and even glues such as polydopamine and/or polysiloxanes. These various coatings to solid electrolyte 112 may offer various benefits, including reduction in dendritic growth of lithium during plating at metal ion deposit 120 and on solid electrolyte 112, extending possible range of choices for solid electrolyte 112 composition for various applications, and prevention reaction between various highly useful materials for construction of solid-state anode 111 and lithium, or other, metals.

Alternatively, it is contemplated herein that metal ion deposit 120 may be replaced by an anode current collector placed therein solid-state anode 111 within solid electrolyte 112. These may include foils or coatings upon which metals, specifically lithium, may be deposited. Exemplary materials for an anode current collector placed therein solid-state anode 111 within solid electrolyte 112 may include but are not limited to vanadium nitride, lithium-aluminum alloy(s), liquid metals including gallium, indium, and tin, the like, and/or combinations thereof.

Figure 2:
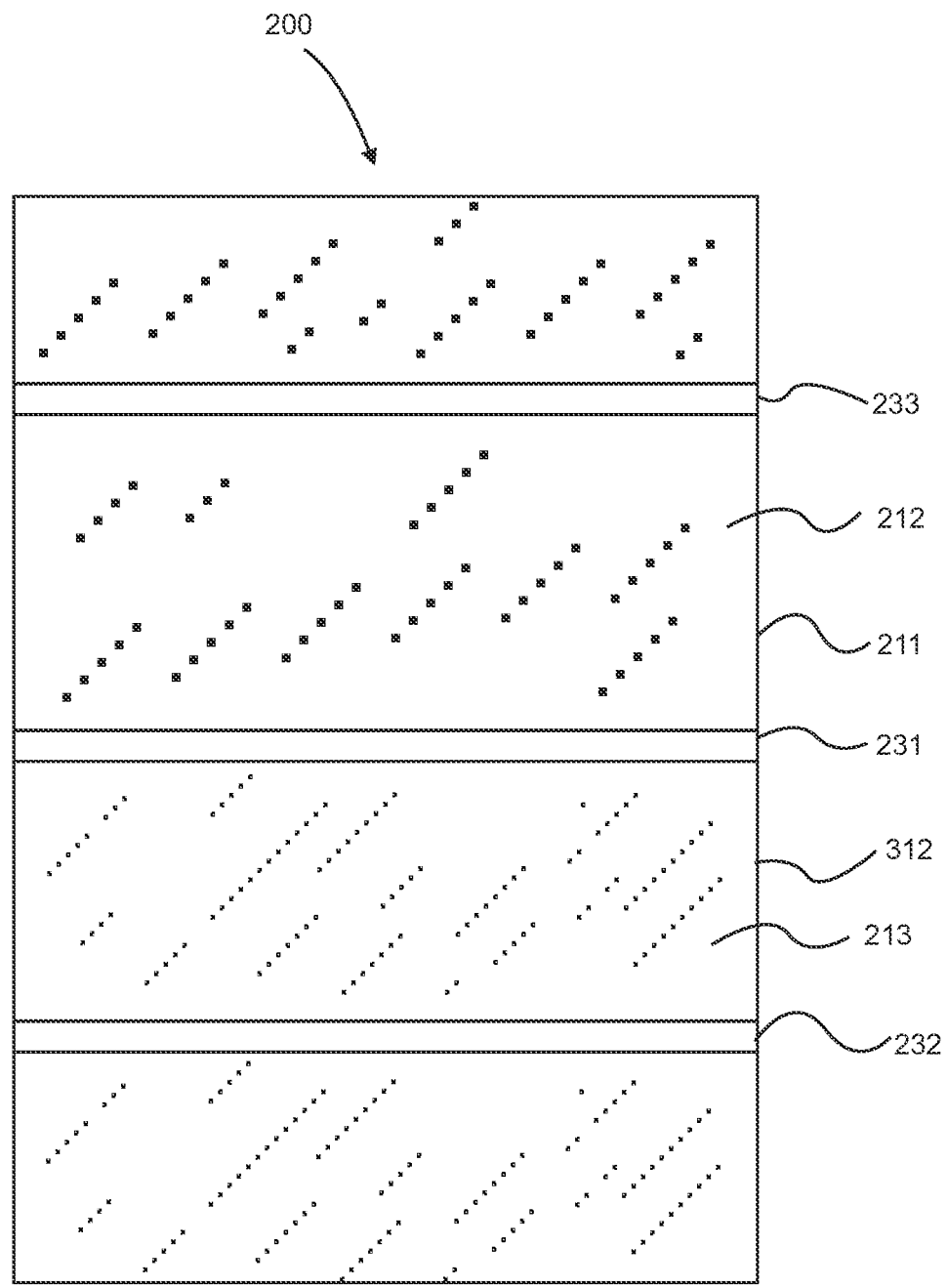
FIG. 2 is a diagram of components of a prior art battery.

Referring now specifically to FIG. 2, illustrated therein is an example of a sectional view of a cell of liquid electrolyte lithium-ion battery 200. Generally, a traditional lithium-ion battery, as liquid electrolyte lithium-ion battery 200 may include liquid electrolyte anode 211 having graphite anode active material 212 and anode current collector 233, porous separator 231, and cathode 312 having liquid electrolyte cathode current collector 232. Known variations of lithium-ion batteries having liquid electrolytes may achieve 275 Wh/kg capacities and feature the ability to recharge, but have the serious shortcomings covered in the Background section above.

If sufficient open space is achieved while maintaining structure, lithium smooth plating, as well as other considerations herein described, solid-state battery 100 may achieve substantially higher capacities while allowing for additional benefits such as durability, safety, quick charging, as well as other above-mentioned benefits. For instance, the 275 Wh/kg capacity of liquid electrolyte lithium-ion battery 200 can be compared to solid-state battery 100 of the disclosure, which has in various forms and combinations, achieved upwards of 635 Wh/kg.

Figure 3:
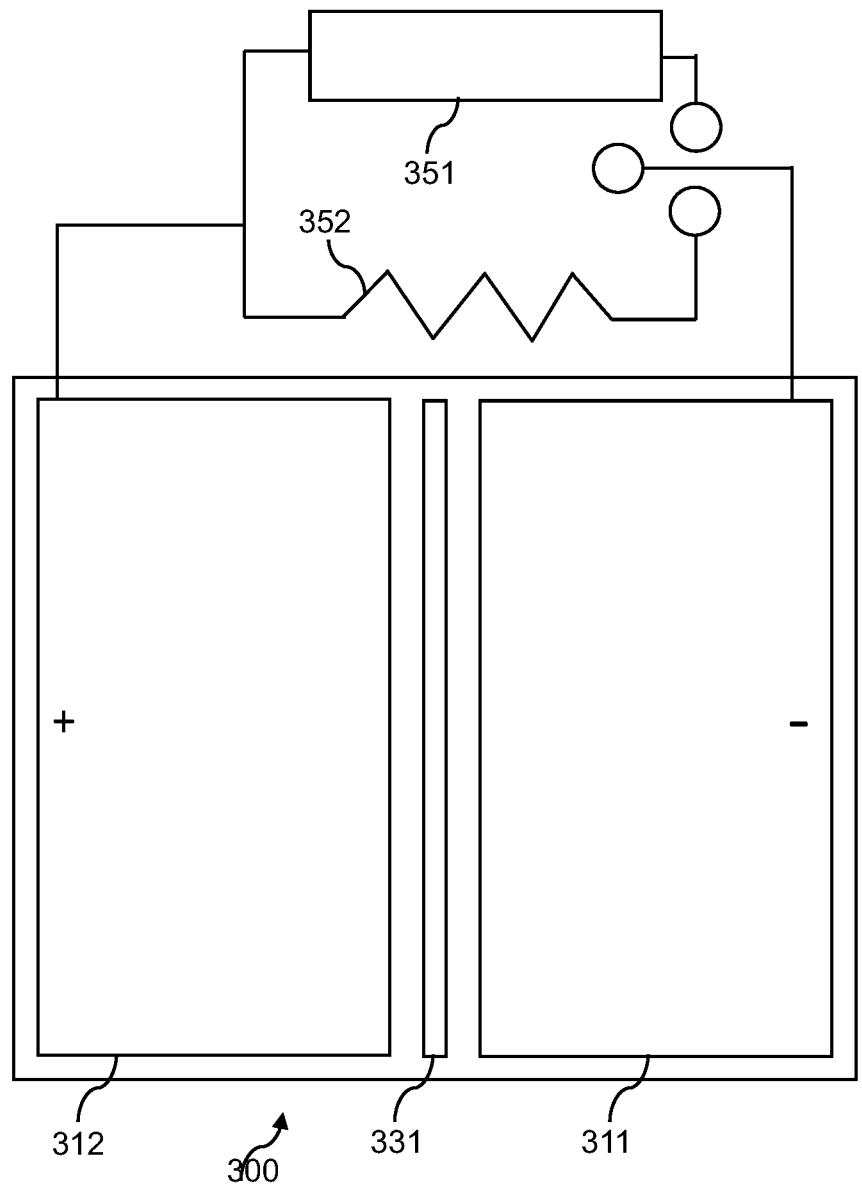
FIG. 3 is a block drawing of a battery.

Referring now specifically to FIG. 3, illustrated therein is a simple block diagram for battery 300 having anode 311, cathode 312, separator 331, charger 351, and powered device 352. When cathode 312 is in conductive contact with charger 351, a circuit is formed with anode 311, thereby charging battery 300. Alternatively, when cathode 312 is in conductive contact with powered device 352, a circuit is formed with anode 311 and powered device 351 is powered. Each of charging and powering occur through any form of known electrochemical processes between anode 311 and cathode 312. In addition to various features, components, methods of manufacture, and improvements to solid-state anode 111 of solid-state battery 100 as herein described, the parts and features of battery 300 may be required to fully manufacture and use solid-state battery 100. Furthermore, various improvements to the parts of battery 300, as known and developed in the art of battery manufacture, including solid-state battery 100 manufacture, may further increase the benefits as herein described of solid-state anode 111. A mere substitution of solid-state anode 111 for anode 311 may not suffice, and one skilled in the art of battery design and manufacture may implement and adapt the features of solid-state anode 111 into battery 300 so as to fully take advantage of the disclosure herein.

Figure 4:
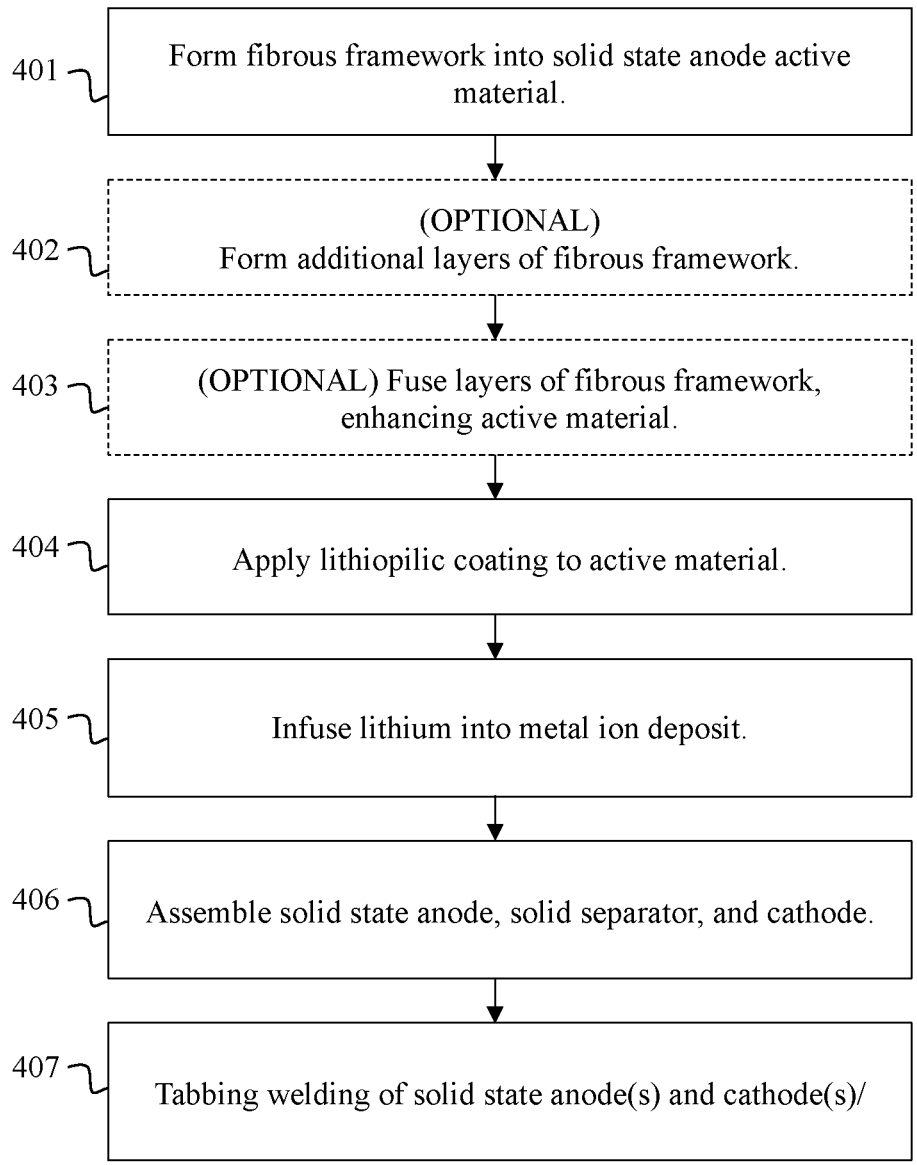
FIG. 4 is a flow chart of an exemplary method of manufacture of the high energy density lithium metal based anode of the disclosure.

Referring now specifically to FIG. 4, illustrated therein is a flowchart of an exemplary method of manufacture of solid-state anode 111 of solid-state battery 100. Beginning at first method step 401, fibrous framework is formed into solid-state anode 111, which is an active material. Optionally, additional layers of fibrous framework may be assembled to form solid-state anode 111 at second step (optional) 402 and the layers of fibrous framework may be fused at third step (optional) 403. A lithiophilic coating may be applied to solid-state anode 111 at forth method step 404. At fifth method step 405 a lithium deposit may be infused into solid-state anode 111 to form metal ion deposit 120. In order to form solid-state battery 100, solid-state anode 111, solid separator 131, and solid-state cathode 312 may be placed in contact with each other at sixth method step 406, then tabbing welding may be used to connect solid-state anode 111 and solid-state cathode 312. Steps of the disclosed method of FIG. 4 may be reordered, repeated, and/or rearranged as one skilled in the art shall desire to achieve the intended effects.

With respect to the above description then, it is to be realized that the optimum dimensional relationships, to include variations in size, materials, shape, form, position, function and manner of operation, assembly, type anode/cathode/battery container, type of connection(s), and use, are intended to be encompassed by the present disclosure. It is contemplated herein that the high energy density lithium metal based anode, or solid-state anode 111, for solid-state lithium-ion batteries (solid-state battery 100) and the various parts and components herein described may include a variety of overall sizes and corresponding sizes for and of various parts, including but not limited to: solid-state anode 111, solid electrolyte 112, metal ion deposit 120, solid separator 131, cathode 312, cathode current collector 132 the like and/or combinations thereof. Indeed, those various parts and components of solid-state battery 100 may vary in size, shape, etc. during the standard operation of solid-state battery 100. The description of the high energy density lithium metal based solid-state anode 111 for solid-state battery 100 herein mentions benefits for electric automobiles and other electronic devices, but the invention is not so limited. The high energy density lithium metal based anode for solid-state lithium-ion batteries of the disclosure may have applications for powering other vehicles, computers, businesses, homes, industrial facilities, consumer and portable electronics, hospitals, factories, warehouses, government facilities, datacenters, emergency backup, aerospace, space travel, robotics, drones, the like and/or combinations thereof. The chemical formulas, metals, atomic and molecular compositions (the "disclosed formulas") provided herein are exemplary only. One skilled in the art would know that variations of the disclosed formulas may offer tradeoffs to the disclosed high energy density lithium metal based solid-state anode 111 for solid-state battery 100 and may be substituted to accomplish similar advantages to the high energy density lithium metal based anode for solid-state lithium-ion batteries of the disclosure. Furthermore, it is contemplated that due to variations in materials and manufacturing techniques, including but not limited to polymers, alloys, metals, assembly, tabbing, welding, atmospheric composition, the like and combinations thereof, that a variety of considerations may be considered with regard to battery manufacture. Yet still, though the inventor has contemplated various methods of manufacturing and assembling a battery to accomplish the result(s) of a greater per-mass electric storage capacity (energy density), providing high currents of operation, increasing the durability and longevity of a battery, increasing the range at which a battery may reliably operate, provide a safer battery, and a more efficient means of production, the disclosure is not limited to the specific components, the benefits herein recited and described, and/or the methods of manufacture recited herein.

The foregoing description and drawings comprise illustrative embodiments. Having thus described exemplary embodiments, it should be noted by those skilled in the art that the disclosures herein are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein, but is limited only by the following claims.

What is claimed is:

1. A battery comprising:
   an at least one cathode;
   an at least one anode having a lithium conductive ceramic composite fiber framework capable of conducting Li+ and a plurality of inter-fiber spaces capable of accommodating electrochemical plating of lithium metal;
   an at least one separator in contact with said at least one cathode and said at least one anode; and
   a melt infused electronically conductive lithium foil anchored therein a portion of the plurality of inter-fiber spaces;
   wherein an electrochemical reduction of the plurality of lithium ions occurs at an interface of said melt infused electronically conductive lithium foil and a space of the plurality of inter-fiber spaces.

2. The battery of claim 1, wherein the melt infused electronically conductive lithium foil acts as a current collector within said anode.

3. The battery of claim 2, wherein said lithium conductive ceramic composite fiber framework is formed via a sintering.

4. The battery of claim 1, wherein the lithium conductive ceramic composite fiber is coated with a lithiophilic coating.

5. The battery of claim 4, wherein the lithiophilic coating is an at least one metal selected from a group of metals, the group of metals consisting of lithium-aluminum alloy, gallium, indium, and tin.

6. The battery of claim 1, wherein the at least one separator is a solid separator.

7. The battery of claim 1, wherein the at least one separator is a porous separator.

8. The battery of claim 7, wherein the lithium conductive ceramic composite fiber framework comprises a fibrous material having a lithiophilic surface coating deposited thereon.

9. The battery of claim 8, wherein the lithiophilic surface coating is an at least one coating from a group of coatings, the group of coatings consisting of an oxide coating, a nitride coating, a polymer coating, and a ceramic coating.

10. The battery of claim 7, wherein the lithiophilic surface coating is an oxide coating from a group of oxide coatings, the group of oxide coatings consisting of niobium oxide, $Al_2O_3+ZnO$ (AZO), aluminum oxide, indium oxide, zinc oxide, bismuth oxide, magnesium oxide, silicon oxide, gold oxide, iodine oxide, and sulfur oxide.

11. The battery of claim 7, wherein the lithiophilic surface coating is a nitride coating from a group of nitride coatings, the group of nitride coatings consisting of a vanadium nitride coating and a boron nitride coating.

12. The battery of claim 1, wherein the lithiophilic ceramic composite fiber framework is formed from an at least one material from a group of materials, the group of materials consisting of a ceramic fiber and a polymer fiber.

13. The battery of claim 1, wherein said at least one anode and said at least one cathode contain no liquid electrolyte.

14. The battery of claim 1, wherein the lithiophilic fiber framework is a solid having a greater than 70% porosity.

15. The battery of claim 14, wherein an active material is deposited inside said lithium conductive fiber framework and said plurality of spaces are capable of receiving 30% solid lithium metal by mass.

16. The battery of claim 15, wherein said active material is interfaced with a lithiophilic coating.

17. The battery of claim 1, wherein the lithium conductive ceramic composite fiber framework is constructed from at least one process of a group of processes, the group of processes consisting of a reactive sintering, a sintering within an electric field, a microwave sintering, a spark plasma sintering, a cold sintering, a solvent evaporation, and a flash sintering using high currents.

* * * * *